US012537331B2

(12) United States Patent
Lee et al.

(10) Patent No.: US 12,537,331 B2
(45) Date of Patent: Jan. 27, 2026

(54) ELECTRICAL CONNECTOR ASSEMBLY FOR A TERMINAL-LESS SEALED IN-LINE CONNECTION SYSTEM

(71) Applicant: Lear Corporation, Southfield, MI (US)

(72) Inventors: Hyoun Lee, Rochester, MI (US); Jomary Quemado Ledesma, Lap-lapu (PH); Samson Pasicaran, Cebu (PH); Mark Neil Janulgue Pecaoco, Lap-lapu (PH)

(73) Assignee: Lear Corporation, Southfield, MI (US)

( * ) Notice: Subject to any disclaimer, the term of this patent is extended or adjusted under 35 U.S.C. 154(b) by 418 days.

(21) Appl. No.: 18/090,800

(22) Filed: Dec. 29, 2022

(65) Prior Publication Data

US 2024/0222899 A1 Jul. 4, 2024

(51) Int. Cl.
*H01R 13/426* (2006.01)
*H01R 13/502* (2006.01)
*H01R 24/60* (2011.01)

(52) U.S. Cl.
CPC ......... *H01R 13/426* (2013.01); *H01R 13/502* (2013.01); *H01R 24/60* (2013.01)

(58) Field of Classification Search
CPC .... H01R 13/426; H01R 13/502; H01R 24/60; H01R 11/09; H01R 13/22; H01R 13/28; H01R 13/506; H01R 13/52
See application file for complete search history.

(56) References Cited

U.S. PATENT DOCUMENTS

| | | | | |
|---|---|---|---|---|
| 3,038,140 | A | 6/1962 | Haberland | |
| 4,138,188 | A | 2/1979 | Shannon | |
| 5,308,262 | A | 5/1994 | Chishima | |
| 5,378,161 | A | 1/1995 | Loder | |
| 5,807,130 | A | 9/1998 | Miller et al. | |
| 6,064,003 | A | 5/2000 | Moore et al. | |
| 6,755,680 | B2 | 6/2004 | Okamura et al. | |
| 7,063,560 | B2 | 6/2006 | Asao | |
| 7,232,334 | B2 * | 6/2007 | Shimizu | H01R 12/771 439/496 |
| 7,354,308 | B2 * | 4/2008 | Iwahori | H01R 12/778 439/587 |
| 8,113,880 | B2 * | 2/2012 | Cappe | H01R 13/5205 439/587 |
| 8,840,412 | B2 | 9/2014 | Ohyama et al. | |
| 9,203,179 | B2 * | 12/2015 | Ohyama | H01R 13/5216 |
| 9,300,085 | B2 | 3/2016 | Morello et al. | |
| 9,508,465 | B2 | 11/2016 | Miura et al. | |
| 9,871,313 | B2 | 1/2018 | Saito et al. | |
| 11,296,438 | B1 * | 4/2022 | Lee | H01R 12/592 |

(Continued)

*Primary Examiner* — Abdullah A Riyami
*Assistant Examiner* — Nader J Alhawamdeh
(74) *Attorney, Agent, or Firm* — MacMillan, Sobanski & Todd, LLC

(57) ABSTRACT

An electrical connector assembly quickly and easily provides mechanical and electrical connections between two flat flexible conductors, each having multiple electrically conductive traces provided thereon, in a sealed environment that resists the entry of contaminants therein. The electrical connector assembly includes an electrically conductive structure, a wire contact wedge supporting the electrically conductive structure, a connector housing supporting the wire contact wedge and the electrically conductive structure, and a front cover supported on the connector housing.

20 Claims, 10 Drawing Sheets

(56) References Cited

U.S. PATENT DOCUMENTS

| | | | | |
|---|---|---|---|---|
| 11,469,539 | B2 * | 10/2022 | Lee | H01R 12/774 |
| 11,489,307 | B1 * | 11/2022 | Cabañero | H01R 43/048 |
| 2008/0045066 | A1 | 2/2008 | Peter et al. | |
| 2022/0109255 | A1 * | 4/2022 | Lee | H01R 13/506 |
| 2022/0209456 | A1 * | 6/2022 | Lee | H01R 12/774 |
| 2024/0222899 | A1 * | 7/2024 | Lee | H01R 13/22 |

* cited by examiner

ELECTRICAL CONNECTOR ASSEMBLY FOR A TERMINAL-LESS SEALED IN-LINE CONNECTION SYSTEM

BACKGROUND OF THE INVENTION

This invention relates in general to electrical connector assemblies that provide mechanical and electrical connections between two electrically conductive structures. In particular, this invention relates to several embodiments of an improved structure for such an electrical connector assembly that can quickly and easily provide mechanical and electrical connections between two flat flexible conductors, each having multiple electrically conductive traces provided thereon, in a sealed environment that resists the entry of contaminants therein.

Many electrical systems are known in the art that include one or more electrically operated devices. For example, most automobiles and other vehicles include a variety of electrically operated devices that can be selectively used for the comfort and convenience of a driver or an occupant. Each of these electrically operated devices is usually connected to a source of electrical energy (or other components of the electrical system) by one or more electrical conductors. In many instances, electrical connector assemblies are provided to facilitate both the initial connections of the electrically operated devices through the electrical conductors to other portions of the electrical system and, if needed, the subsequent disconnection therefrom.

A typical electrical connector assembly includes both a female connector assembly that is connected to a first electrical conductor and a male connector assembly that is connected to a second electrical conductor. The female and male connector assemblies are designed to cooperate with one another to provide the secure (and usually releasable) mechanical and electrical connections between the first and second electrical conductors. In those instances, each of the female and male connector assemblies frequently includes an outer housing (usually formed from an electrically non-conductive material) and a plurality of inner electrical terminals (usually formed from an electrically conductive material). Each outer housing may include a first opening, through which the associated electrical conductor may extend into engagement with the plurality of inner electrical terminals supported therein. Each outer housing may also a second opening, through which the female and male connector assemblies may be mechanically and electrically connected together.

In many instances, these electrical connector assemblies are located in environments that are or may be exposed to undesirable contaminants, such as dirt, water, and the like. Although known electrical connector assemblies provide some protection against the entry of such contaminants within the outer housings thereof, it would be desirable to provide an improved structure for such an electrical connector assembly that can quickly and easily provide mechanical and electrical connections between two flat flexible conductors, each having multiple electrically conductive traces provided thereon, in a sealed environment that resists the entry of contaminants therein.

SUMMARY OF THE INVENTION

This invention relates to an improved structure for an electrical connector assembly that can quickly and easily provide mechanical and electrical connections between two flat flexible conductors, each having multiple electrically conductive traces provided thereon, in a sealed environment that resists the entry of contaminants therein. The electrical connector assembly includes an electrically conductive structure, a wire contact wedge supporting the electrically conductive structure, a connector housing supporting the wire contact wedge and the electrically conductive structure, and a front cover supported on the connector housing.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
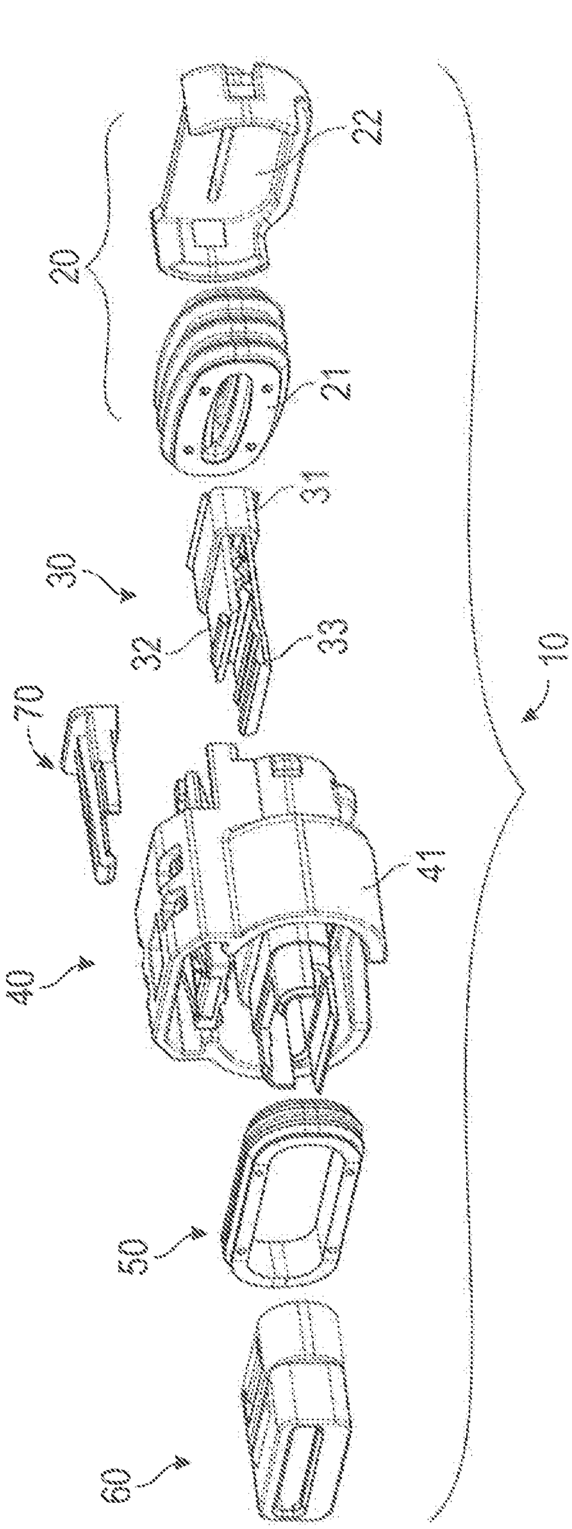
FIG. 1 is an exploded perspective view of a female connector assembly for an electrical connector assembly in accordance with this invention.
Figure 2:
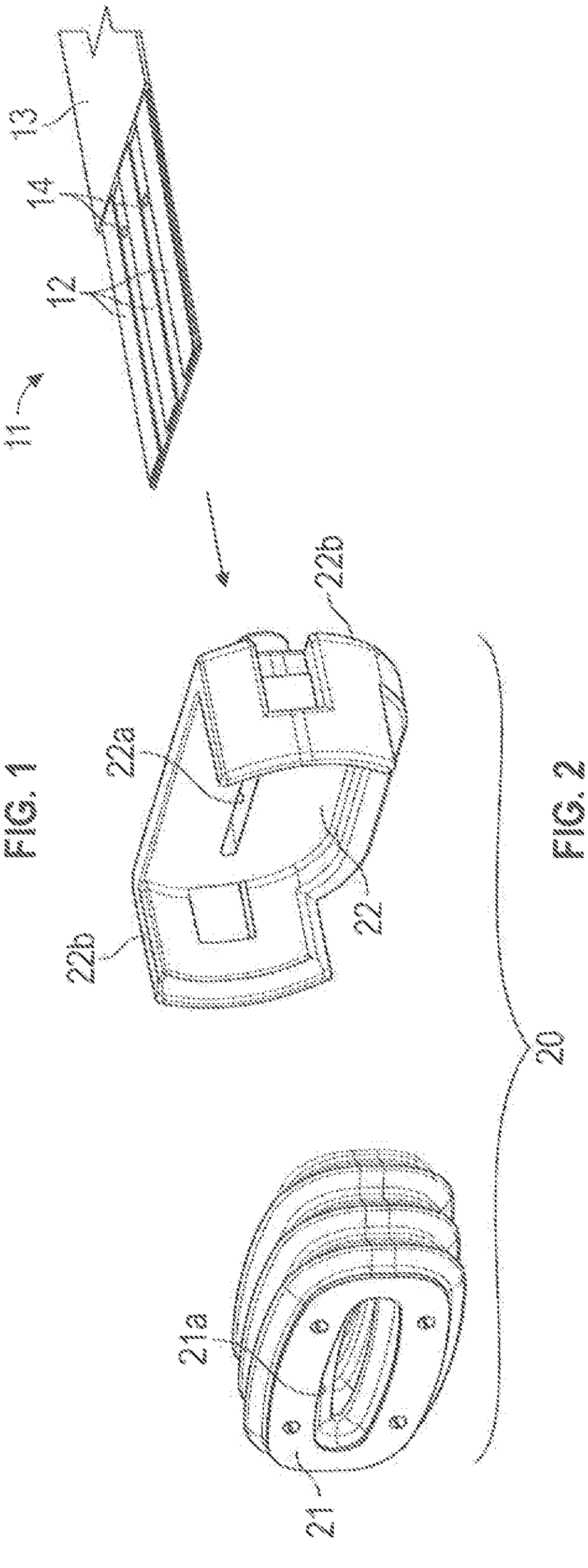
FIG. 2 is an enlarged exploded perspective view of a matte seal assembly of the female connector assembly shown in FIG. 1 prior to being assembled with a flat flexible conductor.
Figure 3:
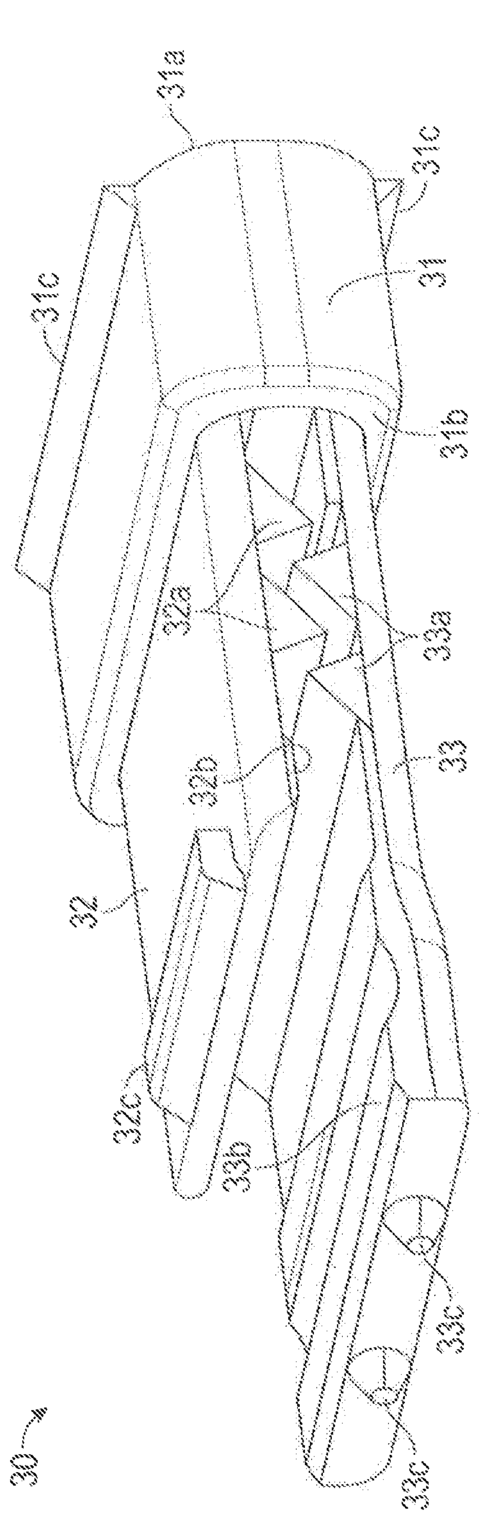
FIG. 3 is a further enlarged perspective view of a wire contact wedge of the female connector assembly shown in FIG. 1.

Referring now to the drawings, there is illustrated in FIGS. 1 through 13 an exploded view of a female connector assembly, indicated generally at 10, in accordance with this invention. As will be described in detail below, the illustrated female connector assembly 10 is supported on an end of a first electrical conductor 11 that, in the illustrated embodiment, is a conventional flat flexible conductor. The illustrated flat flexible conductor 11 includes three elongated electrically conductive traces 12 that are surrounded by an outer electrically non-conductive insulator 13. However, a greater or lesser number of such electrically conductive traces 12 may be provided as desired. As best shown in FIG. 2, a portion of the illustrated insulator 13 (the portion that is located near the end of the flat flexible conductor 11) has been removed to facilitate access to the electrically conductive traces 12, although such is not required. Lastly, two openings 14 extend through the illustrated flat flexible conductor 11 between adjacent pairs of the three electrically conductive traces 12. The purposes for these openings 14 (which are optional) will also be explained below.

The female connector assembly 10 of this invention includes a matte seal assembly, indicated generally at 20. The illustrated matte seal assembly 20 includes a unitary (i.e., formed from a single piece of material) matte seal 21 having an opening 21*a* that extends axially therethrough. As best shown in FIG. 2, an inner surface defined by the opening 21*a* has approximately the same size and shape as the size and shape of the flat flexible conductor 11, although such is not required. Also, both this inner surface defined by the opening 21*a* and an outer surface of the matte seal 21 are formed having undulating sealing surfaces, although again such as not required. The matte seal 21 of the matte seal assembly 20 is preferably formed from an elastomeric material, such as silicon, although any desired material may be used.

The matte seal assembly 20 also includes an axially-oriented retainer 22. In the illustrated embodiment, the retainer 22 has approximately the same general shape as the matte seal 21 of the matte seal assembly 20, although such is not required. A slot 22*a* extends through the retainer 22. In the illustrated embodiment, the slot 22*a* has approximately the same size and shape as the size and shape of the flat flexible conductor 11, although again such is not required. Lastly, a pair of arm portions 22*b* extend generally axially from the retainer 22. The purposes for the retainer 22, the slot 22*a*, and the arm portions 22*b* will be explained below. The retainer 22 of the matte seal assembly 20 is preferably formed from a relatively rigid material, such as plastic, although any desired material may be used.

The illustrated matte seal assembly 20 includes a single matte seal 21 (having a single opening 21*a* extending therethrough) and a single retainer 22 (having a single slot 22*a* extending therethrough). Thus, the illustrated matte seal assembly 20 is adapted for use with a single flat flexible conductor 11 and a single wire contact wedge 30 as described and illustrated herein. However, it will be appreciated that either or both of the matte seal 21 and the retainer 22 may have multiple openings 21*a* and slots 22*a* extending therethrough, which would facilitate their use with multiple (or modified) wire contact wedges 30 to accommodate a plurality of flat flexible conductors 11, such as described in U.S. Pat. No. 11,469,539, the disclosure of which is incorporated herein by reference.

The female connector assembly 10 of this invention also includes a wire contact wedge, indicated generally at 30. The illustrated wire contact wedge 30 includes a hollow base 31 that extends axially from a first end 31*a* to a second end 31*b*. A pair of base retainers 31*c* extend outwardly apart from one another in opposite directions from the first end 31*a* of the base 31 for a purpose that will be explained below.

The wire contact wedge 30 also includes a first wedge arm 32 that extends axially from the second end 31*b* of the base 31 and has both an inwardly-facing surface and an outwardly-facing surface. Two serrations 32*a* are provided on the inwardly-facing surface of the first wedge arm 32 and extend generally transversely relative thereto. However, any desired number of such serrations 32*a* (including none) may be provided, and those serrations 32*a* may have any desired shape or combination of shapes. Additionally, an engagement structure 32*b* is also provided on the inwardly-facing surface of the first wedge arm 32 and extends generally transversely relative thereto. Lastly, a wedge retainer 32*c* is provided on the outwardly-facing surface of the first wedge arm 32 and extends generally transversely relative thereto. The purposes for the serrations 32*a*, the engagement structure 32*b*, and the wedge retainer 32*c* will be explained below.

If desired, one or more embossments (not shown) may be provided on the inwardly-facing surface of the first wedge arm 32. The number of such embossments is preferably the same as the number of traces 12 provided on the flat flexible conductor 11, although such is not required. The purposes for these embossments will also be explained below.

Lastly, the wire contact wedge 30 includes a second wedge arm 33 that also extends axially from the second end 31*b* of the base 31 and has both an inwardly-facing surface and an outwardly-facing surface. Two serrations 33*a* are provided on the inwardly-facing surface of the second wedge arm 33 and extend generally transversely relative thereto. However, any desired number of such serrations 33*a* (including none) may be provided, and those serrations 33*a* may have any desired shape or combination of shapes. Additionally, two engagement structures 33*b* are also provided on the inwardly-facing surface of the second wedge arm 33 and extend generally transversely relative thereto. Lastly, two wedge projections 33*c* are provided on the outwardly-facing surface of the second wedge arm 33 and extend generally axially relative thereto. The purposes for the serrations 33*a*, the engagement structures 33*b*, and the wedge projections 33*c* will be explained below.

The female connector assembly 10 of this invention further includes a connector housing, indicated generally at 40. As will be explained below, the connector housing 40 is adapted to receive and support the wire contact wedge 30, the matte seal assembly 20, and the flat flexible conductor 11 therein. To accomplish this, the illustrated connector housing 40 includes a body 41 having an opening 41*a* that extends axially from a first axial end 41*b* to a second axial end 41*c*. In the illustrated embodiment, the portion of the opening 41*a* that is adjacent to the first axial end 41*b* of the body 41 is larger than the portion of the opening 41*a* that is adjacent to the second axial end 41*c* of the body 41, although such is not required. As a result, an axially-facing abutment surface 41*d* (see FIG. 20) is defined within the opening 41*a* extending through the body 41. A pair of opposed retainers 41*e* is provided on the exterior of the connector housing 40, for a purpose that will be explained below.

Also, one or more supports 42*a* and 42*b* (two in the illustrated embodiment) extend axially away from the second axial end 41*c* of the body 41 of the connector housing 40, adjacent to the opening 41*a*. In the illustrated embodiment, an inwardly facing surface on the outer end of the support 42*b* has a recessed area 42*c* provided thereon. The supports 42*a* and 42*b* additionally define an axially-extending sealing surface 42*d* and a radially extending sealing wall 42*e*. Lastly, a retaining aperture 43 is provided on the body 41 adjacent to the second axial end 41*c* thereof. The purposes for the axially-facing abutment surface 41*d*, the supports 42*a* and 42*b*, the recessed area 42*c*, the axially extending sealing surface 42*d*, the radially extending sealing wall 42*e*, and retaining aperture 43 will also be explained below.

The female connector assembly 10 of this invention also includes a radial seal, indicated generally at 50. The illustrated radial seal 50 includes a unitary (i.e., formed from a single piece of material) body 51 having an opening 51*a* that extends axially therethrough. As best shown in FIG. 10, an inner surface of the radial seal 50 that is defined by the opening 51*a* preferably has approximately the same size and shape as the size and shape of a supporting surface (see FIGS. 9, 10, and 11) provided on the connector housing 40, although such is not required. The inner surface of the body 51 of the illustrated radial seal 50 is generally smooth, while an outer surface of such body 51 is formed having an undulating shape, although again such as not required. The body 51 of the radial seal 50 is preferably formed from an elastomeric material, such as silicon, although any desired material may be used.

The female connector assembly 10 of this invention further includes a front cover, indicated generally at 60, that is adapted to be received within and supported on the same (or similar) supporting surface provided on the connector housing 40, although again such is not required. The illustrated front cover 60 includes a hollow body 61 that extends axially from an opened end 61*a* axial to a closed end 61*b*. An opening 62 extend generally axially through the closed axial end 61*b* of the hollow body 61 to the interior thereof. In the illustrated embodiment, a single opening 62 extends through the closed end 61*b* of the hollow body 61, although a greater number of such openings 62 may be provided if desired. Preferably, each opening 62 is axially aligned with an associated one of the traces 12 provided on the flat flexible conductor 11, although again such is not required. Also, a flexible retaining arm 63 is formed integrally with or otherwise provided on the hollow body 61 of the front cover 60. The purposes for the front cover 60, the opening 62, and the retaining arm 63 will be explained below.

Lastly, the electrical connector assembly may further include a connector position assurance 70. The connector position assurance 70 is, of itself, conventional in the art and may be provided to both (1) provide a clear visual indication that the female and male connectors assemblies 10 and assembly 110 have been properly assembled, and (2) prevent the female and male connector assemblies 10 and assembly 110 from being disassembled without performing an affirmative mechanical manipulation of some sort.

Figure 4:
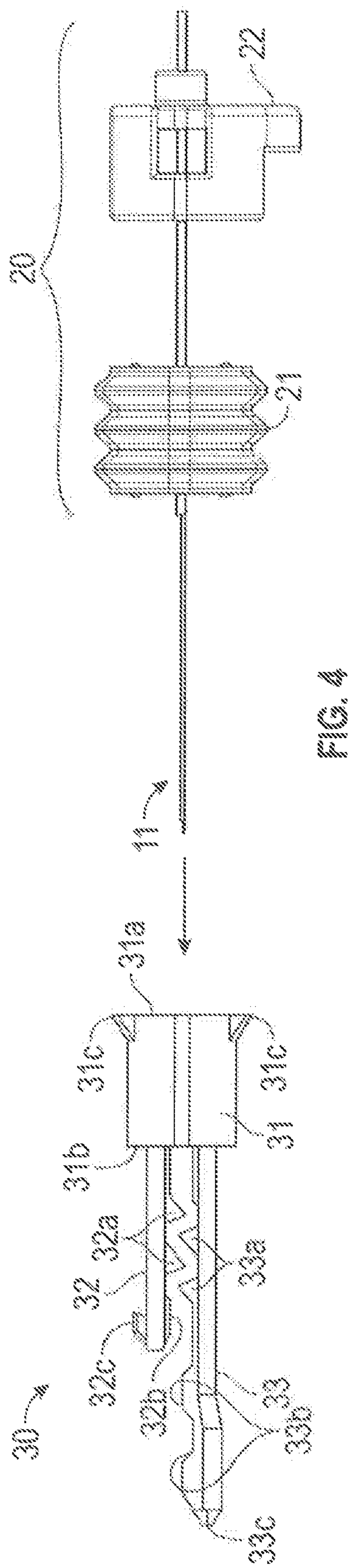
FIG. 4 is an exploded side elevational view of the wire contact wedge shown in FIG. 3 prior to being assembled with the matte seal assembly and the flat flexible conductor shown in FIG. 2.
Figure 5:
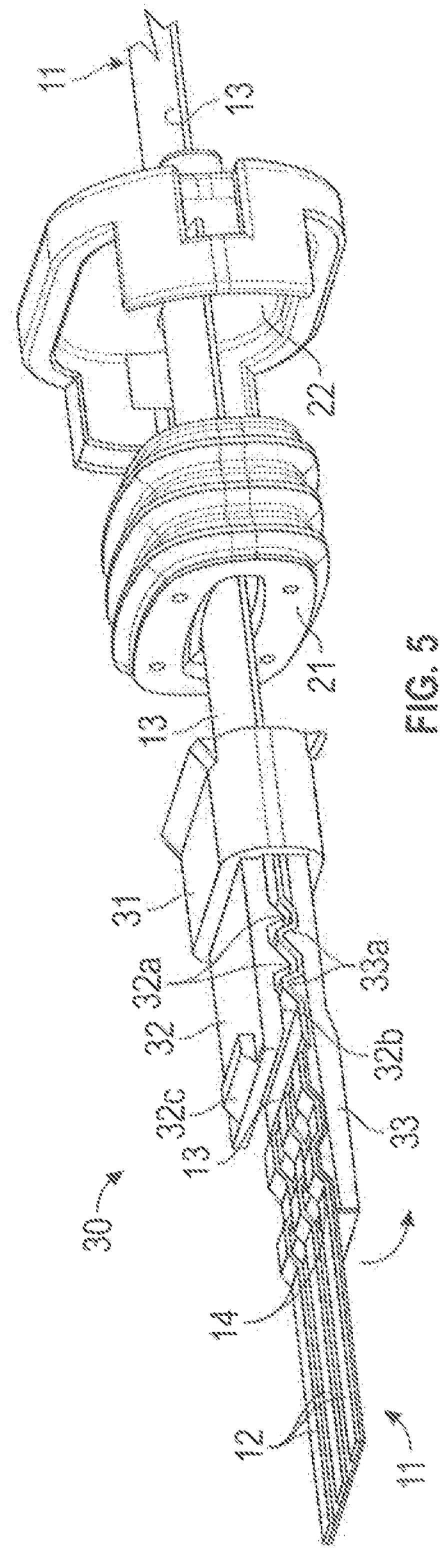
FIG. 5 is a perspective view showing the wire contact wedge, the matte seal assembly, and the flat flexible conductor shown in FIG. 4 after being partially assembled.

FIGS. 2, 4, and 5 illustrate how the matte seal assembly 20 and the wire contact wedge 30 can be assembled with the flat flexible conductor 11. Initially, as shown in FIG. 2, a leading end of the flat flexible conductor 11 is axially aligned with the matte seal 21 and the retainer 22 of the matte seal assembly 20. Then, as shown in FIG. 4, the leading end of the flat flexible conductor 11 is inserted through both the slot 22*a* through the retainer 22 and the opening 21*a* through the matte seal 21. In this manner, the matte seal 21 and the retainer 22 of the matte seal assembly 20 are initially supported on the flat flexible conductor 11.

Then, as also shown in FIG. 4, the leading end of the flat flexible conductor 11 is axially aligned with the first end of the hollow base 31 of the wire contact wedge 30. Next, as shown in FIG. 5, the leading end of the flat flexible conductor 11 is inserted through the hollow base 31 and between the first and second wedge arms 32 and 33. During such axial movement, the flat flexible conductor 11 preferably moves the first and second wedge arms 32 and 33 to spread apart from one another, thereby allowing the flat flexible conductor 11 to pass through the area between the serrations 32*a* and 33*a* respectively provided thereon. Thus, it is desirable (but not necessarily required) that the first and second wedge arms 32 and 33 be sufficiently flexible to allow this spreading apart movement to occur.

Figure 6:
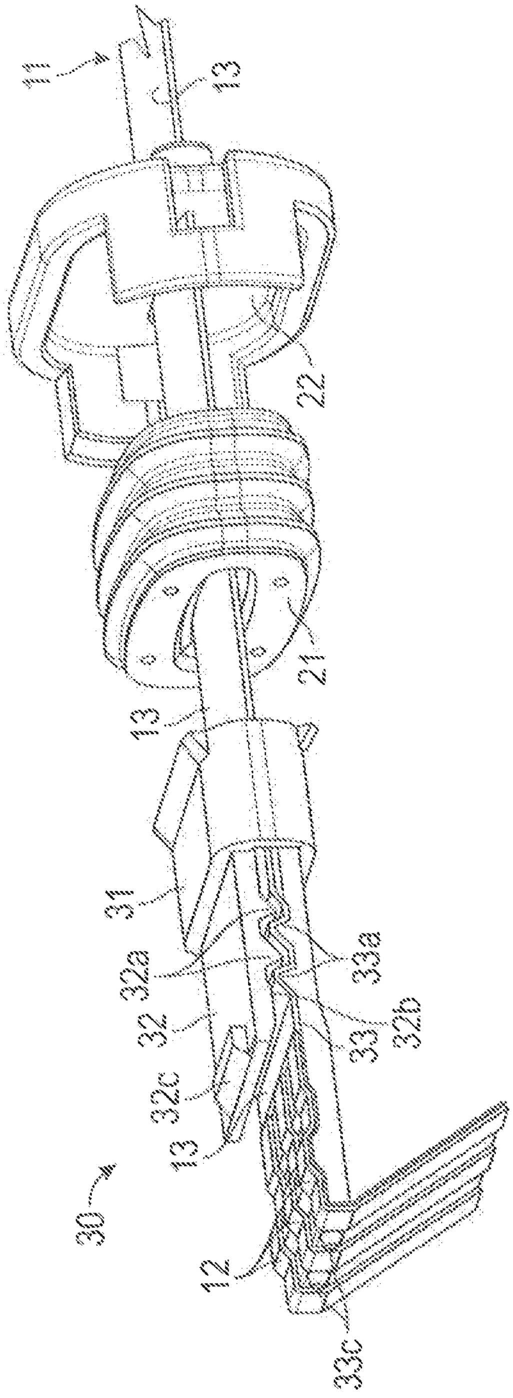
FIG. 6 is a perspective view similar to FIG. 5 after a portion of the flat flexible conductor has been deformed about a portion of the wire contact wedge.

The axial movement of the flat flexible conductor 11 continued until the openings 14 extending through the flat flexible conductor 11 are disposed adjacent to the projections 33*c* provided on the axial end of the second wedge arm 33 of the wire contact wedge 30, as shown in FIG. 5. Then, the leading end of the flat flexible conductor 11 is deformed such that the openings 14 extending through the flat flexible conductor 11 are respectively moved about such the projections 33*c*, as shown in FIG. 6. As a result, the flat flexible conductor 11 is positively positioned relative to the wire contact wedge 30 to prevent relative axial movement from occurring therebetween during subsequent steps in the assembly process and during use.

Figure 7:
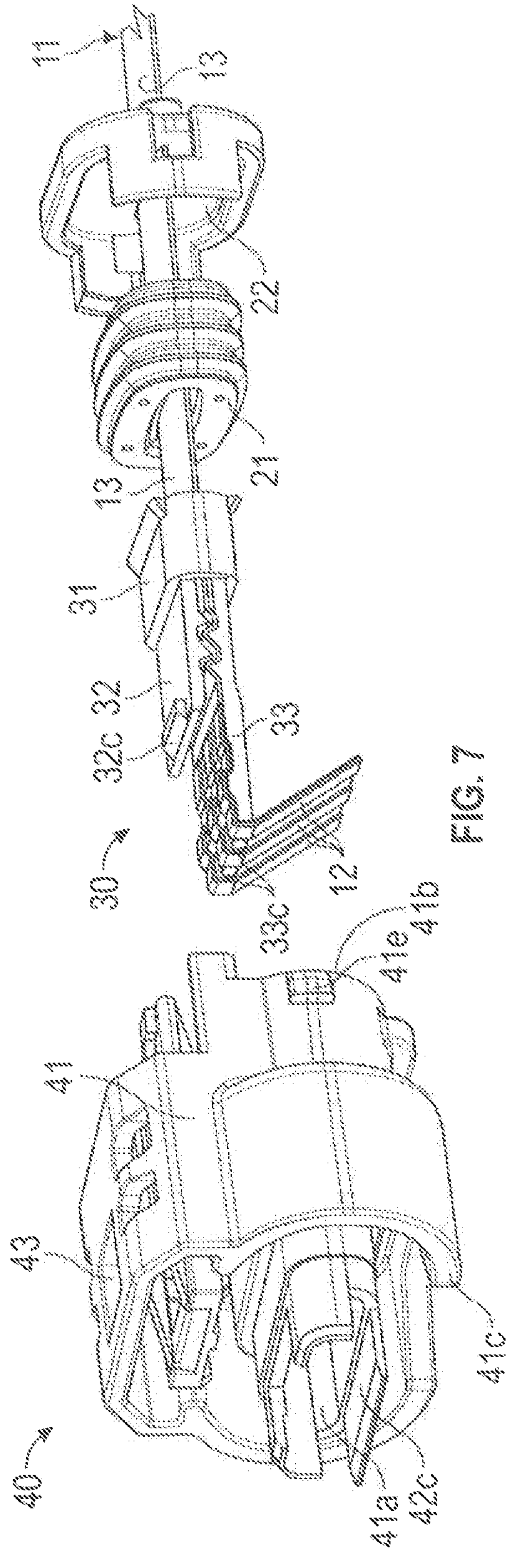
FIG. 7 is an exploded perspective view of a connector housing of the female connector assembly shown in FIG. 1 prior to being assembled with the wire contact wedge, the matte seal assembly, and the flat flexible conductor shown in FIG. 6.
Figure 8:
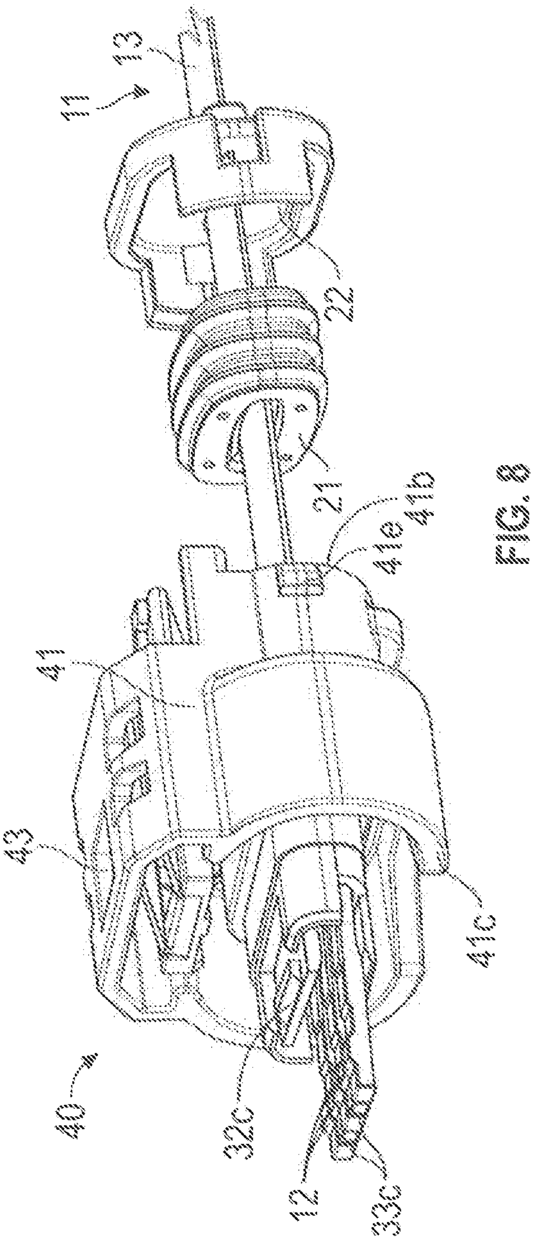
FIG. 8 is a perspective view similar to FIG. 7 after the wire contact wedge and the flat flexible conductor have been assembled with the connector housing.
Figure 9:
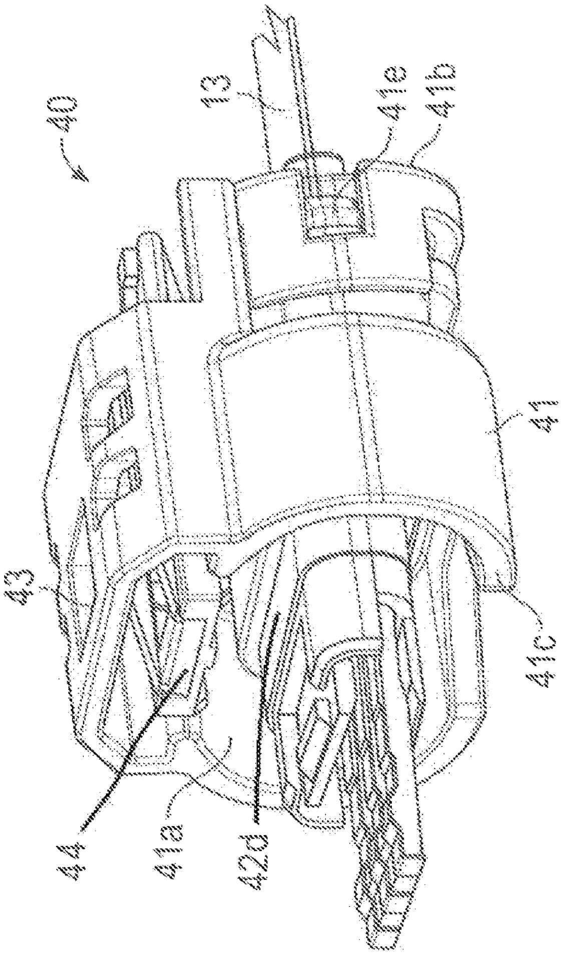
FIG. 9 is a perspective view similar to FIG. 8 after the matte seal assembly has been assembled with the connector housing and the flat flexible conductor.
Figure 10:
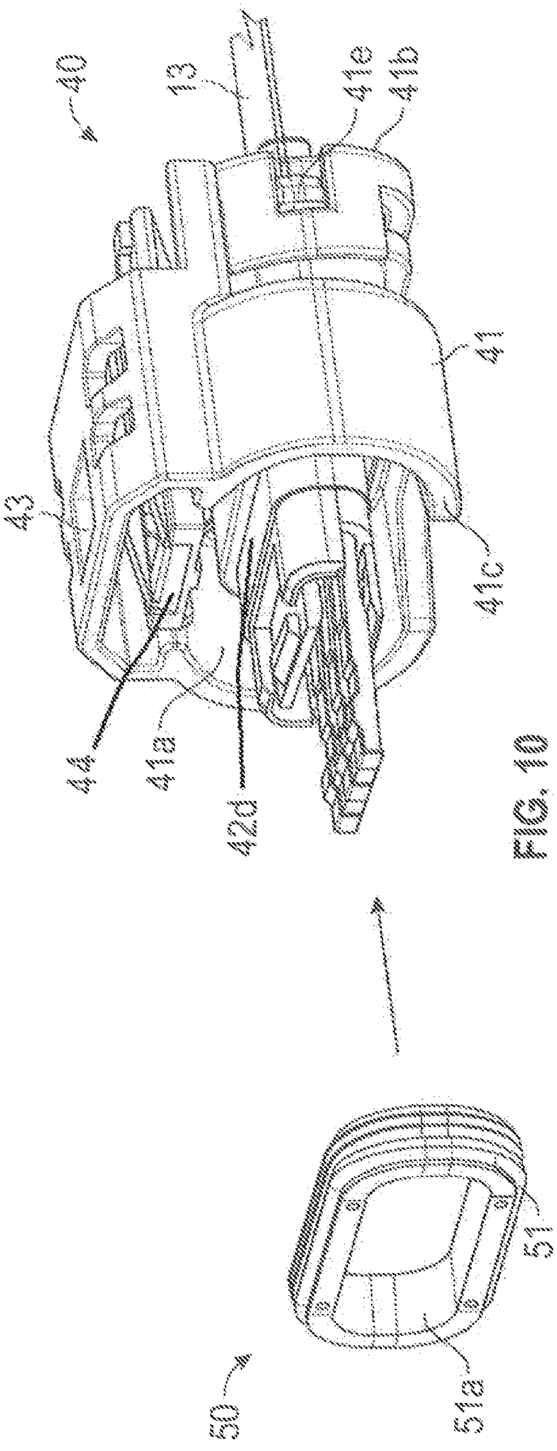
FIG. 10 is an exploded perspective view of a radial seal of the female connector assembly shown in FIG. 1 prior to being assembled with the connector housing, the wire contact wedge, the matte seal assembly, and the flat flexible conductor illustrated in FIG. 9.

FIGS. 7, 8, and 9 illustrate how the connector housing 40 can be assembled with the wire contact wedge 30, the matte seal assembly 20, and the flat flexible conductor 11. Initially, as shown in FIG. 7, the assembly of the wire contact wedge 30, the matte seal assembly 20, and the flat flexible conductor 11 is axially aligned with the first axial end 41*b* of the body 41 of the connector housing 40, adjacent to the first end of the opening 41*a* therethrough. Then, the assembly of the wire contact wedge 30, the matte seal assembly 20, and the flat flexible conductor 11 is inserted through the opening 41*a* and moved axially within the body 41 of the connector housing 40 (from right to left when viewing FIG. 8).

Figure 20:
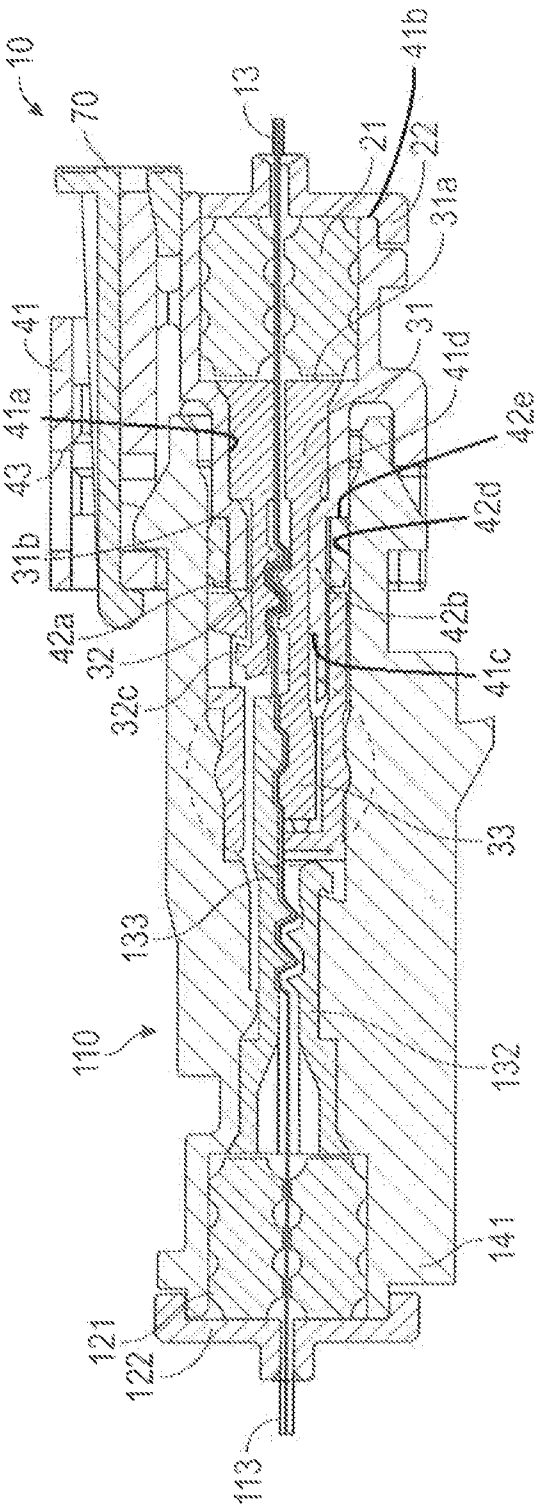
FIG. 20 is a cross sectional view after the female connector assembly illustrated in FIGS. 1 through 13 has been assembled with the male connector assembly illustrated in FIGS. 14 through 19 to form the electrical connector assembly.

Such axial movement is continued until the second end 31*b* of the hollow base 31 of the wire contact wedge 30 engages the abutment surface 41*d* provided within the body 41 of the contact housing 40 (see FIG. 20). As a result, further axial movement of the assembly of the wire contact wedge 30, the matte seal assembly 20, and the flat flexible conductor 11 relative to the connector housing 40 is prevented. In this orientation, the wedge arms 32 and 33 extend between and are supported by the supports 42*a* and 42*b* extending from the body 41 of the connector housing 40 adjacent to the opening 41*a*. At the same time, a portion of the end of the flat flexible conductor 11 is received within the recessed area 42*c* provided on the inwardly facing surface of the support 42*b* of the body 41 of the connector housing 40. As a result, the end of the flat flexible conductor 11 is positively positioned relative to the connector housing 40.

At the same time, or thereafter, the matte seal 21 of the matte seal assembly 20 is moved axially within the first end 41*b* of the connector housing 40. Preferably, the matte seal 21 of the matte seal assembly 20 is slightly larger in size than the first end 41*b* of the connector housing 40. As a result, the outer undulating surface of the matte seal 21 of the matte seal assembly 20 is compressed against the inner surface of the first end 41*b* of the connector housing 40, and the inner undulating surface of the matte seal 21 of the matte seal assembly 20 is compressed against the outer surface of the flat flexible conductor 11 (see FIG. 20). Thus, the matte seal 21 of the matte seal assembly 20 positively prevents the entry of contaminants through the first end 41*b* into the connector housing 40. Lastly, the retainer 22 of the matte seal assembly 20 is moved axially adjacent to the first end 41*b* of the connector housing 40 such that the arm portions 22*b* of the retainer 22 respectively engage the retainers 41*e* provided on the connector housing 40. As a result, the retainer 22 positively retains, and protectively covers, the matte seal 21 of the matte seal assembly 20 on the connector housing 40.

Figure 11:
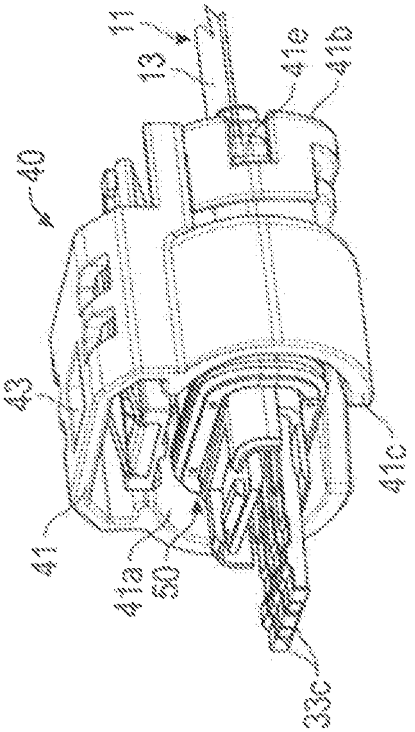
FIG. 11 is a perspective view similar to FIG. 10 after the radial seal, the connector housing, the wire contact wedge, the matte seal assembly, and the flat flexible conductor have been assembled.

FIGS. 10 and 11 illustrate how the radial seal 50 can be assembled with the connector housing 40. Initially, as shown in FIG. 10, the body 51 of the radial seal 50 is axially aligned with the axially extending sealing surface 42*d* on the supports 42*a* and 42*b* provided on the body 41 of the connector housing 40. Then, as shown in FIG. 11, the body 51 of the radial seal 50 can be moved axially about the axially extending sealing surface 42*d* on the supports 42*a* and 42*b*. As mentioned above, the inner surface of the body 51 is preferably is slightly smaller than the outer surface of the axially extending sealing surface 42*d* on the supports 42*a* and 42*b*. As a result, the inner surface of the body 51 is compressed against the outer surface of the axially extending sealing surface 42*d* on the supports 42*a* and 42*b*, as shown in FIG. 11. The size of body 51 can be selected to attain a desired amount of compression of the radial seal 50 against the axially extending sealing surface 42*d*. Such axial movement of the radial seal 50 is continued until the leading end thereof abuts the radially extending sealing wall 42*e* (see FIG. 20).

Figure 13:
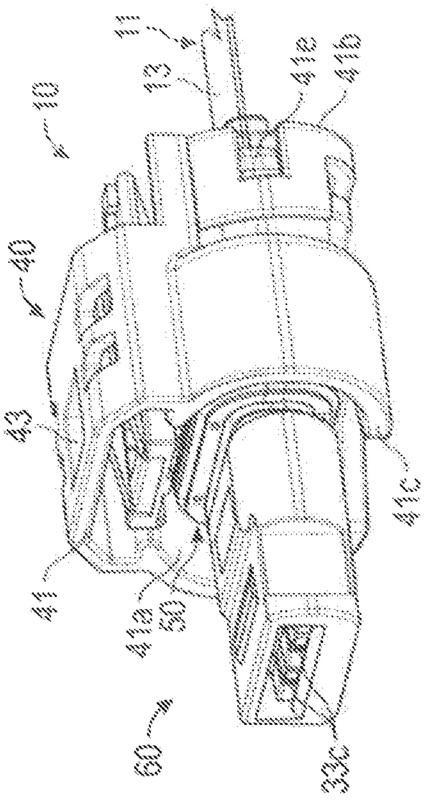
FIG. 13 is a perspective view similar to FIG. 12 after the front cover, the radial seal, the connector housing, the wire contact wedge, the matte seal assembly, and the flat flexible conductor have been assembled to form the female connector assembly.
Figure 12:
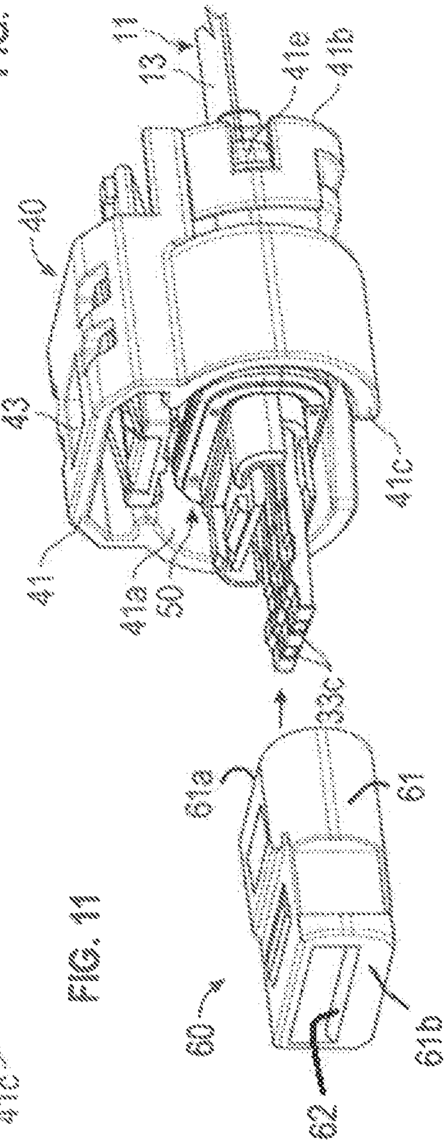
FIG. 12 is an exploded perspective view of a front cover of the female connector assembly shown in FIG. 1 prior to being assembled with the radial seal, the connector housing, the wire contact wedge, the matte seal assembly, and the flat flexible conductor illustrated in FIG. 11.

FIGS. 12 and 13 illustrate how the front cover 60 can be assembled with the connector housing 40. Initially, as shown in FIG. 12, the assembly of the connector housing 40, the wire contact wedge 30, the matte seal assembly 20, and the flat flexible conductor 11 is axially aligned with the body 61 of the front cover 60, adjacent to the opened axial end 61*a* thereof. Then, the body 61 of the front cover 60 is moved axially toward the second axial end 41*c* of the body 41 of the connector housing 40 such that the supports 42*a* and 42*b* of the body 41 move axially through the opened axial end 61*a* of the front cover 60 into the interior thereof. Such axial movement continues until the opened axial end 61*a* of the front cover 60 abuts an axially facing portion of the connector housing 40, such as adjacent to the axially extending sealing surface 42*d* (see FIG. 20).

When the front cover 60 is positioned in this orientation relative to the connector housing 40, an inwardly extending portion of the retaining arm 63 is disposed adjacent to the retaining protrusion 32*b* provided on the outer surface of the first wedge arm 32 of the wire contact wedge 30. The retaining arm 63 cooperates with the retaining protrusion 32*b* such that the front cover 60 is positively retained on the assembly of the connector housing 40, the wire contact wedge 30, the matte seal assembly 20, and the flat flexible conductor 11. However, the front cover 60 may be removed from the assembly of the connector housing 40, the wire contact wedge 30, the matte seal assembly 20, and the flat flexible conductor 11 by manually moving the retaining arm 63 outwardly out of engagement with the retaining protrusion 32*b* and pulling the front cover 60 axially in the opposite direction away from the second axial end 41*c* of the body 41 of the connector housing 40.

FIGS. 14 through 19 illustrate a male connector assembly, indicated generally at assembly 110, for the electrical connector assembly in accordance with this invention. The male connector assembly 110 is structured and configured to be connected between a female connector (such as, for example, the female connector assembly 10 described above and shown in FIGS. 1 through 13) and an electrically conductive structure (such as, for example, a flat flexible conductor 111 shown in FIGS. 16 through 19) so as to provide an electrically conductive connection therebetween. The structure and manner of operation of the male connector assembly 110 is similar to the structure and operation of the female connector assembly 10, and like reference numbers (incremented by 100) are used to identify those components of the male connector assembly 110 that are the same or similar in structure and/or operation to the associated components of the female connector assembly 10.

Figure 14:
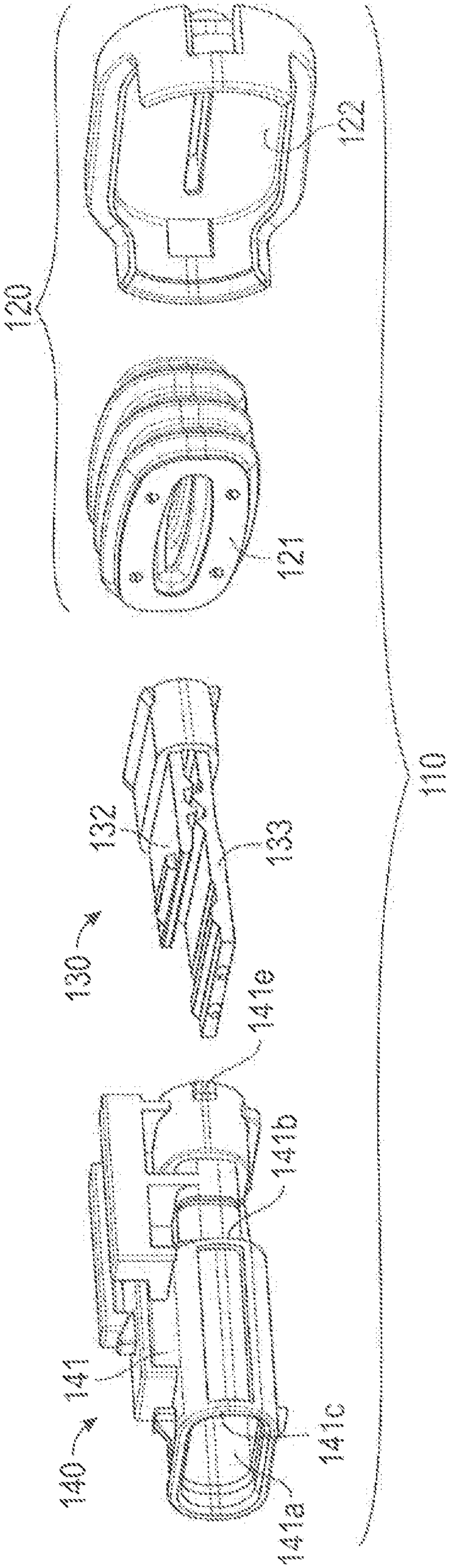
FIG. 14 is an exploded perspective view of a male connector assembly for the electrical connector assembly in accordance with this invention.
Figure 15:
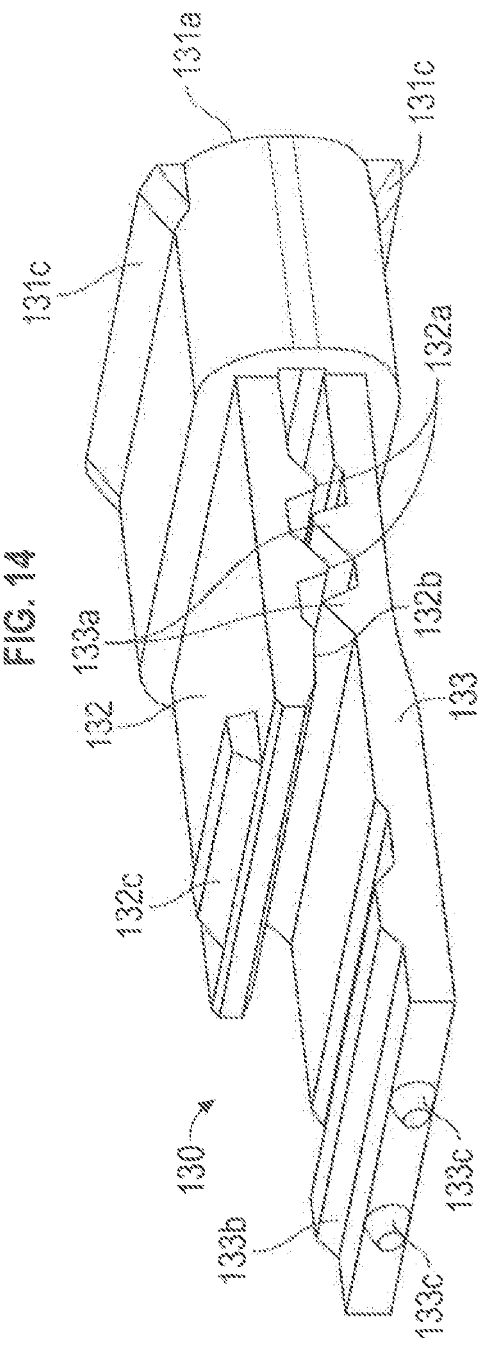
FIG. 15 is an enlarged perspective view of a wire contact wedge of the male connector assembly shown in FIG. 14.
Figure 16:
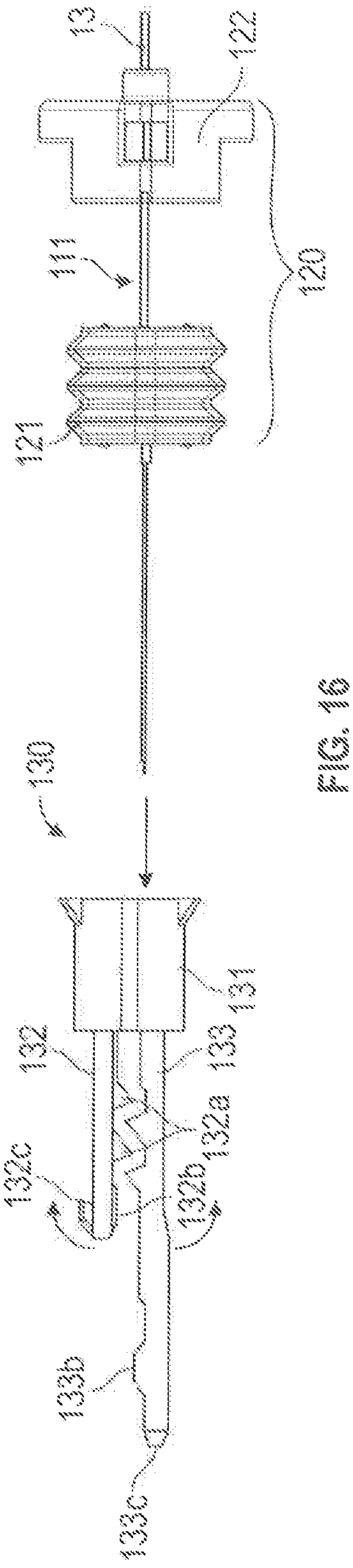
FIG. 16 is an exploded side elevational view of the wire contact wedge shown in FIG. 15 prior to being assembled with a matte seal assembly shown in FIG. 14 and a flat flexible conductor.
Figure 17:
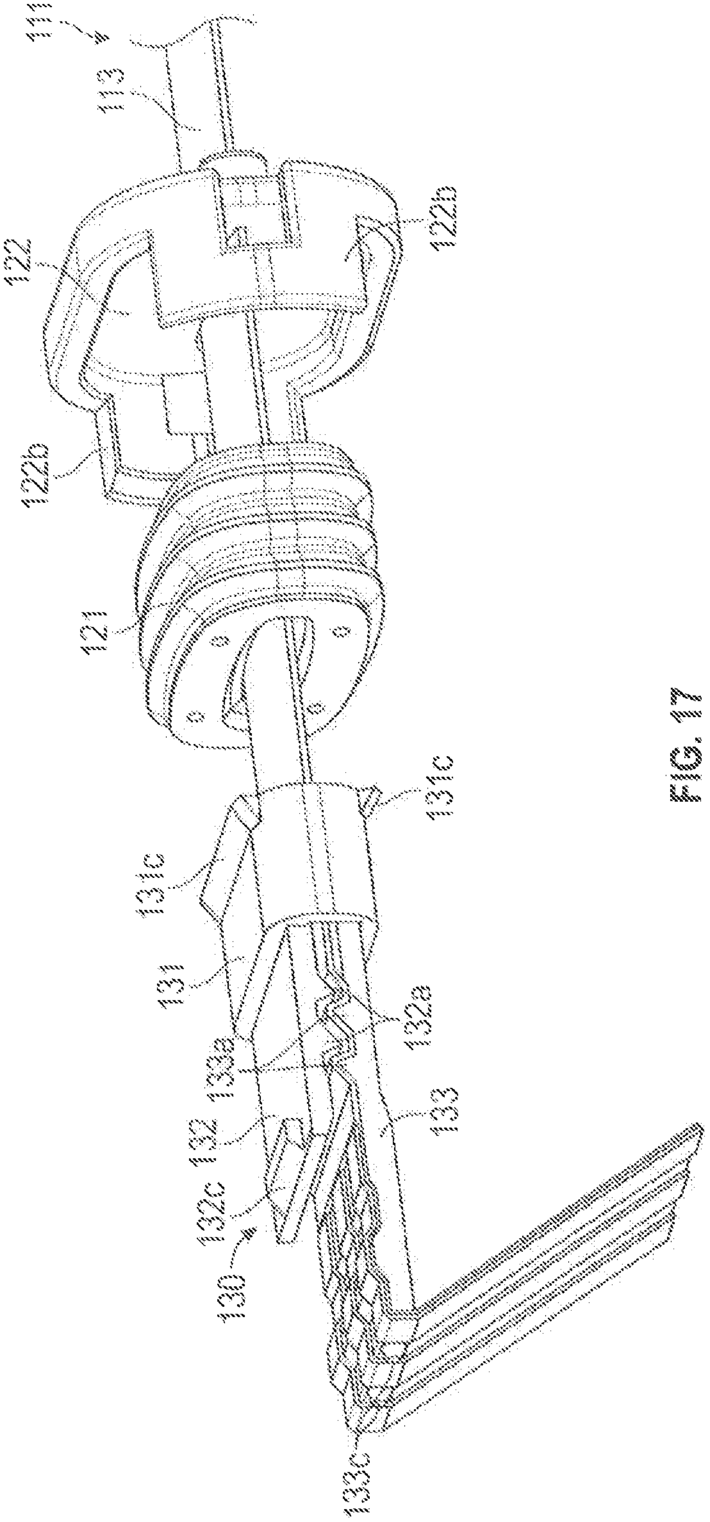
FIG. 17 is a perspective view of the wire contact wedge, the matte seal assembly, and the flat flexible conductor shown in FIG. 16 after being assembled, and further after a portion of the flat flexible conductor has been deformed about a portion of the wire contact wedge.
Figure 18:
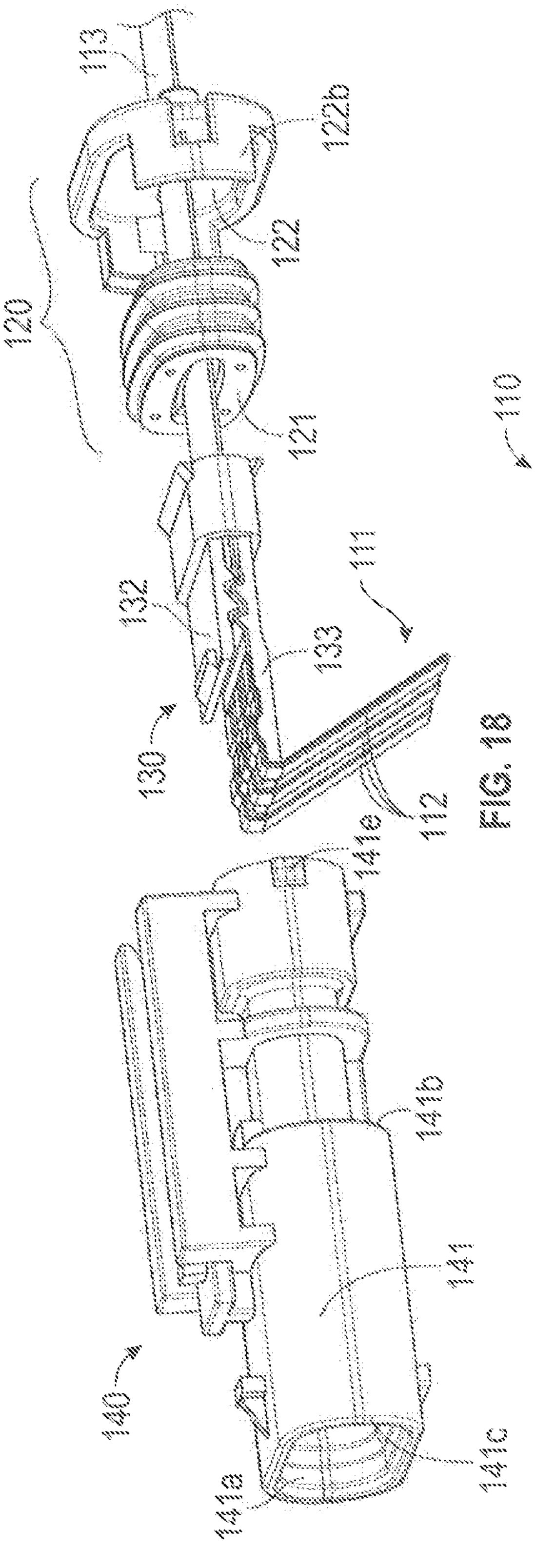
FIG. 18 is an exploded perspective view of a connector housing of the male connector assembly shown in FIG. 14 prior to being assembled with the wire contact wedge, the matte seal assembly, and the flat flexible conductor shown in FIG. 17.
Figure 19:
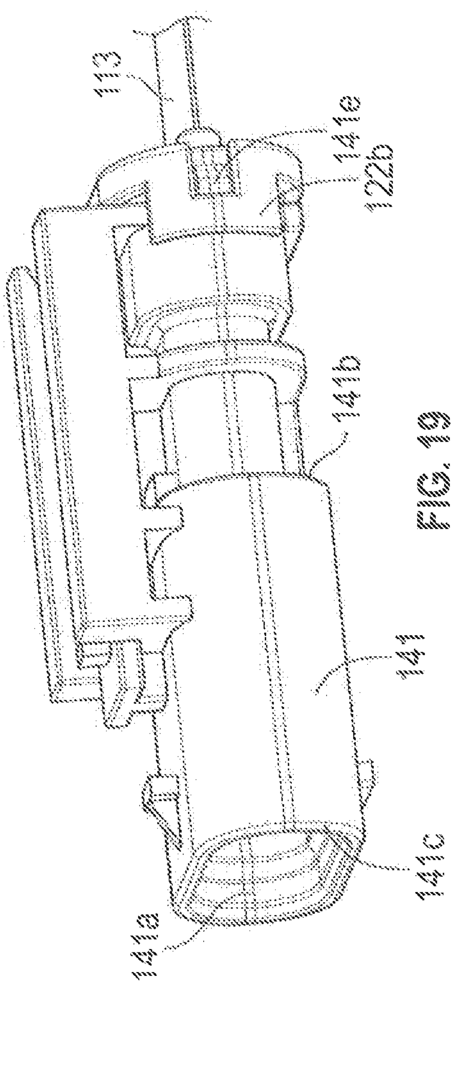
FIG. 19 is a perspective view similar to FIG. 18 after the connector housing, the wire contact wedge, the matte seal assembly, and the flat flexible conductor have been assembled to form the male connector assembly.

Thus, as best shown in FIG. 14, the male connector assembly 110 includes a matte seal assembly 120 having a matte seal 121 and a retainer 122. The structure and operation of the matte seal assembly 120 are identical to the structure and operation of the matte seal assembly 20 of the female connector 10 (although such is not required) and, therefore, will not be repeated herein. The male connector assembly 110 also includes a wire contact wedge, indicated generally at 130, that includes a hollow base 131, a first wedge arm 132 that extends axially from the base 131, and a second wedge arm 133 that extends axially from the base 131. An engagement structure 133*b* is provided on the inner surface of the illustrated second wedge arm 133. The structure and operation of the engagement structure 133*b* will be explained and illustrated in detail below. Lastly, the male connector assembly 110 of this invention includes a connector housing, indicated generally at 140, that is adapted to receive and support the assembly of the wire contact wedge 130, the matte seal assembly 120, and the flat flexible conductor 111 therein, as shown in FIGS. 17 and 18.

FIG. 20 is a cross sectional view of the entire electrical connector assembly shown after the female connector illustrated in FIGS. 1 through 13 has been assembled with the male connector illustrated in FIGS. 14 through 19. When assembled as shown in FIG. 20, the electrically conductive traces 12 provided on the female connector 10 respectively engage the electrically conductive traces 112 provided on the male connector assembly 110. Such engagement is promoted by the cooperation of the locking surface of the retaining hole 44*a* on the engagement structures 44 of the female connector assembly 10 and the engagement structure 144 provided on the male connector housing 140 of the male connector assembly 110.

Figure 21:
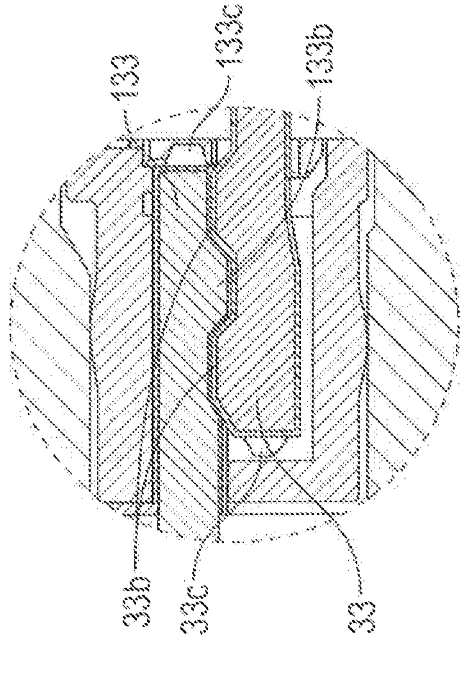
FIG. 21 is an enlarged cross sectional view of the circled portion of the assembly of the female and male connector assemblies illustrated in FIG. 20.

FIG. 21 is an enlarged detailed view of the cooperating engagement structures 33*b* and 133*b* respectively provided on the second wedge arm 33 of the female connector 10 and on the second wedge arm 133 of the male connector assembly 110. As shown therein, the engagement structure 33*b* provided on the second wedge arm 33 of the female connector 10 includes one or more ribs (two in the illustrated embodiment), each of which extends generally transversely relative to the wire contact wedge 30 and has a cross sectional shape including one or more linearly-extending portions. Similarly, the engagement structures 133*b* provided on the second wedge arm 133 of the female connector assembly 110 includes one or more ribs (one in the illustrated embodiment) that extends generally transversely relative to the wire contact wedge 130 and has a cross sectional shape including one or more linearly-extending segments. When the female connector 10 and the male connector assembly 110 are assembled as shown in FIGS. 20 and 21, the single rib engagement structure 133*b* provided on the male connector assembly 110 is received axially between the two rib engagement structures 33*b* provided on the female connector 10 to provide a secure connection between the female connector 10 and the male connector assembly 110 that enhances the electrical connection between the flat flexible conductor 11 and the flat flexible conductor 111. As a result, a reliable electrical connection is maintained between the flat flexible conductor 11 and the flat flexible conductor 111.

Figure 22:
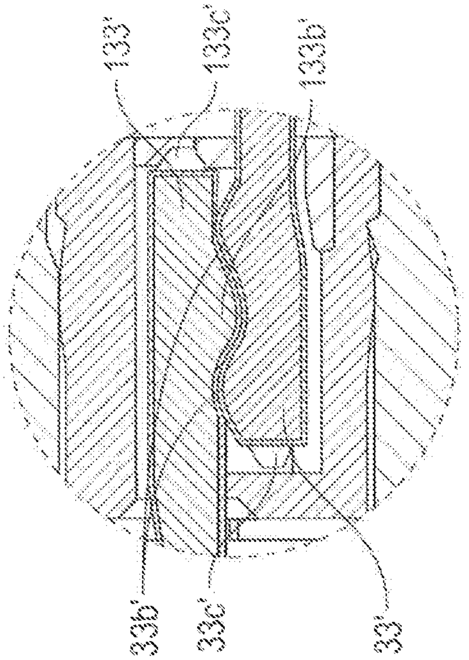
FIG. 22 is an enlarged cross sectional view similar to FIG. 21 showing an alternative embodiment of this invention.

FIG. 22 is an enlarged cross sectional view similar to FIG. 21 showing an alternative embodiment of this invention. As shown therein, the engagement structures 33*b*' provided on the second wedge arm 33' of the female connector 10' includes one or more ribs (two in the illustrated embodiment), each of which extends generally transversely relative to the wire contact wedge 30' and has a continuously-curved cross sectional shape. Similarly, the engagement structures 133*b*' provided on the second wedge arm 133' of the female connector assembly 110' includes one or more ribs (one in the illustrated embodiment) that extends generally transversely relative to the wire contact wedge 130' and has a continuously-curved cross sectional shape. When the female connector 10' and the male connector assembly 110' are assembled as shown in FIGS. 20 and 21, the single rib engagement structure 133*b*' provided on the male connector assembly 110' is received axially between the two rib engagement structures 33*b*' provided on the female connector 10' to provide a secure connection between the female connector 10' and the male connector assembly 110' that enhances the electrical connection between the flat flexible conductor 11' and the flat flexible conductor 111'.

The principle and mode of operation of this invention have been explained and illustrated in its preferred embodiments. However, it must be understood that this invention may be practiced otherwise than as specifically explained and illustrated without departing from its spirit or scope. For example, this invention contemplates that some or all of the structures described and illustrated herein as being provided on the female connector 10 may be alternatively be provided on the male connector assembly 110, and vice versa.

What is claimed is:

1. An electrical connector assembly, comprising:
an electrically conductive structure;
a wire contact wedge comprising a first wedge arm and a second wedge arm supporting the electrically conductive structure between the first wedge arm and the second wedge arm, wherein an end of the electrically conductive structure is deformed around one of the first wedge arm or the second wedge arm;
a connector housing supporting the wire contact wedge and the electrically conductive structure; and
a front cover supported on the connector housing.

2. The electrical connector assembly defined in claim 1, wherein the electrically conductive structure is a flat flexible conductor including a plurality of electrically conductive traces.

3. The electrical connector assembly defined in claim 1, wherein the electrically conductive structure has an opening extending therethrough, and wherein the wire contact wedge includes a protrusion that extends through the opening of the electrically conductive structure after deforming the electrically conductive structure around one of the first wedge arm or the second wedge arm.

4. The electrical connector assembly defined in claim 1, wherein the wire contact wedge includes a base comprising an opening extending therethrough and the first wedge arm and the second wedge arm that extend from the base, and wherein the electrically conductive structure extends through the opening of the base and between the first wedge arm and the second wedge arm.

5. The electrical connector assembly defined in claim 4, wherein each of the first wedge arm and the second wedge arm comprises a projection that engages the electrically conductive structure.

6. The electrical connector assembly defined in claim 5, wherein the projections provided on the first wedge arm and the second wedge arm are axially offset from one another.

7. The electrical connector assembly defined in claim 5, wherein one of the first wedge arm or thesecond wedge arm includes an embossment that is aligned with a trace provided on the electrically conductive structure.

8. The electrical connector assembly defined in claim 1, wherein the wire contact wedge includes a base comprising a first abutment surface, and wherein the connector housing includes a body comprising a a second abutment surface that engages the first abutment surface of the base of the wire contact wedge.

9. The electrical connector assembly defined in claim 8, wherein the wire contact wedge includes a protrusion, and wherein the front cover includes a retaining arm that cooperates with the protrusion provided on the wire contact wedge.

10. The electrical connector assembly defined in claim 1, wherein the wire contact wedge includes a protrusion, and wherein the front cover includes a retaining arm that cooperates with the protrusion provided on the wire contact wedge.

11. The electrical connector assembly of claim 1, wherein one of the first wedge arm or the second wedge arm comprises a wedge retainer extending transversely from an outwardly facing surface of one of the first wedge arm or the second wedge arm.

12. An electrical connector assembly, comprising:
an electrically conductive structure including a flat flexible conductor comprising a plurality of electrically conductive traces;
a wire contact wedge including a base comprising an opening extending therethrough and a first wedge arm and a second wedge arm that extend from the base, the electrically conductive structure extending through the opening of the base and between the first wedge arm and the second wedge arm, wherein an end of the electrically conductive structure is deformed around one of the first wedge arm or the second wedge arm;

a connector housing supporting the wire contact wedge and the electrically conductive structure; and a front cover supported on the connector housing.

13. The electrical connector assembly defined in claim 12, wherein the electrically conductive structure includes a protrusion that extends through the opening of the electrically conductive structure after deforming the electrically conductive structure around one of the first wedge arm or the second wedge arm.

14. The electrical connector assembly defined in claim 12, wherein each of the first wedge arm and the second wedge arm comprises a projection that engages the electrically conductive structure.

15. The electrical connector assembly defined in claim 14, wherein the projections provided on the first wedge arm and the second wedge arm are axially offset from one another.

16. The electrical connector assembly defined in claim 12, wherein one of the first wedge arm or the second wedge arm includes a plurality of embossments aligned with the plurality of traces provided on the electrically conductive structure.

17. The electrical connector assembly defined in claim 12, wherein the wire contact wedge includes a base comprising a first abutment surface, and wherein the connector housing includes a body comprising a second abutment surface that engages the first abutment surface of the base of the wire contact wedge.

18. The electrical connector assembly defined in claim 17, wherein the wire contact wedge includes a protrusion, and wherein the front cover includes a retaining arm that cooperates with the protrusion provided on the wire contact wedge.

19. The electrical connector assembly defined in claim 12, wherein the wire contact wedge includes a protrusion, and wherein the front cover includes a retaining arm that cooperates with the protrusion provided on the wire contact wedge.

20. The electrical connector assembly of claim 12, wherein one of the first wedge arm or the second wedge arm comprises a wedge retainer extending transversely from an outwardly facing surface of one of the first wedge arm or the second wedge arm.

* * * * *